United States Patent
Abaquita

(10) Patent No.: US 10,645,242 B2
(45) Date of Patent: May 5, 2020

(54) IMAGE FORMING APPARATUS

(71) Applicant: KYOCERA Document Solutions Inc., Osaka (JP)

(72) Inventor: Earl John Abaquita, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/486,043

(22) PCT Filed: Apr. 7, 2017

(86) PCT No.: PCT/JP2017/014543
§ 371 (c)(1),
(2) Date: Aug. 14, 2019

(87) PCT Pub. No.: WO2018/185936
PCT Pub. Date: Oct. 11, 2018

(65) Prior Publication Data
US 2020/0053239 A1    Feb. 13, 2020

(51) Int. Cl.
*G06F 3/12*    (2006.01)
*H04N 1/00*    (2006.01)

(52) U.S. Cl.
CPC ..... *H04N 1/00498* (2013.01); *H04N 1/00408* (2013.01); *H04N 1/00472* (2013.01)

(58) Field of Classification Search
None
See application file for complete search history.

(56) References Cited

U.S. PATENT DOCUMENTS

| | | | |
|---|---|---|---|
| 9,098,197 B2 * | 8/2015 | Suese | G06F 3/04886 |
| 9,137,401 B2 * | 9/2015 | Kawakami | H04N 1/00498 |
| 9,875,018 B2 * | 1/2018 | Lin | G06F 3/04883 |
| 2014/0185095 A1 | 7/2014 | Kawakami et al. | |
| 2015/0082234 A1 * | 3/2015 | Lin | G06F 3/04883 715/780 |
| 2017/0286405 A1 * | 10/2017 | Deshmukh | G06F 3/04883 |

FOREIGN PATENT DOCUMENTS

| | | | |
|---|---|---|---|
| JP | 2006-015623 A | 1/2006 | |
| JP | 2006-235790 A | 9/2006 | |
| JP | 2011-061590 A | 3/2011 | |
| JP | 2014-128931 A | 7/2014 | |

* cited by examiner

*Primary Examiner* — Dung D Tran
(74) *Attorney, Agent, or Firm* — IP Business Solutions, LLC

(57) ABSTRACT

In an image forming apparatus, a storage unit contains, by each of a plurality of languages that are respectively associated with each direction of slide operations, a character string. A display controller causes a display unit to display, on a screen, an instruction-receiving image to be touched through a touch panel. When a slide operation is performed on a non-operational region where the instruction-receiving image is not located, the character string of the language associated with the direction of the slide operation is retrieved from the storage unit, and a selected-language window is generated by substituting the character string displayed on the screen of the display unit with the character string that has been retrieved, and displayed only for a predetermined period of time.

7 Claims, 12 Drawing Sheets

Fig.4

| IDENTIFIER / DIRECTION | JAPANESE | KOREAN | FRENCH | ENGLISH | PORTUGUESE |
|---|---|---|---|---|---|
| | DEFAULT | UPWARD | DOWNWARD | RIGHTWARD | LEFTWARD |
| 0025 | プリント | 프린트 | IMPRIMER | PRINT | IMPRESSÃO |
| 0026 | コピー | 복사 | COPIE | COPY | CÓPIA |
| 0027 | 再コピー | 다시 복사 | RECOPIER | RE COPY | RECOPIAR |
| 0028 | イメージ | 이미지 | IMAGE | IMAGE | IMAGEM |

LDT

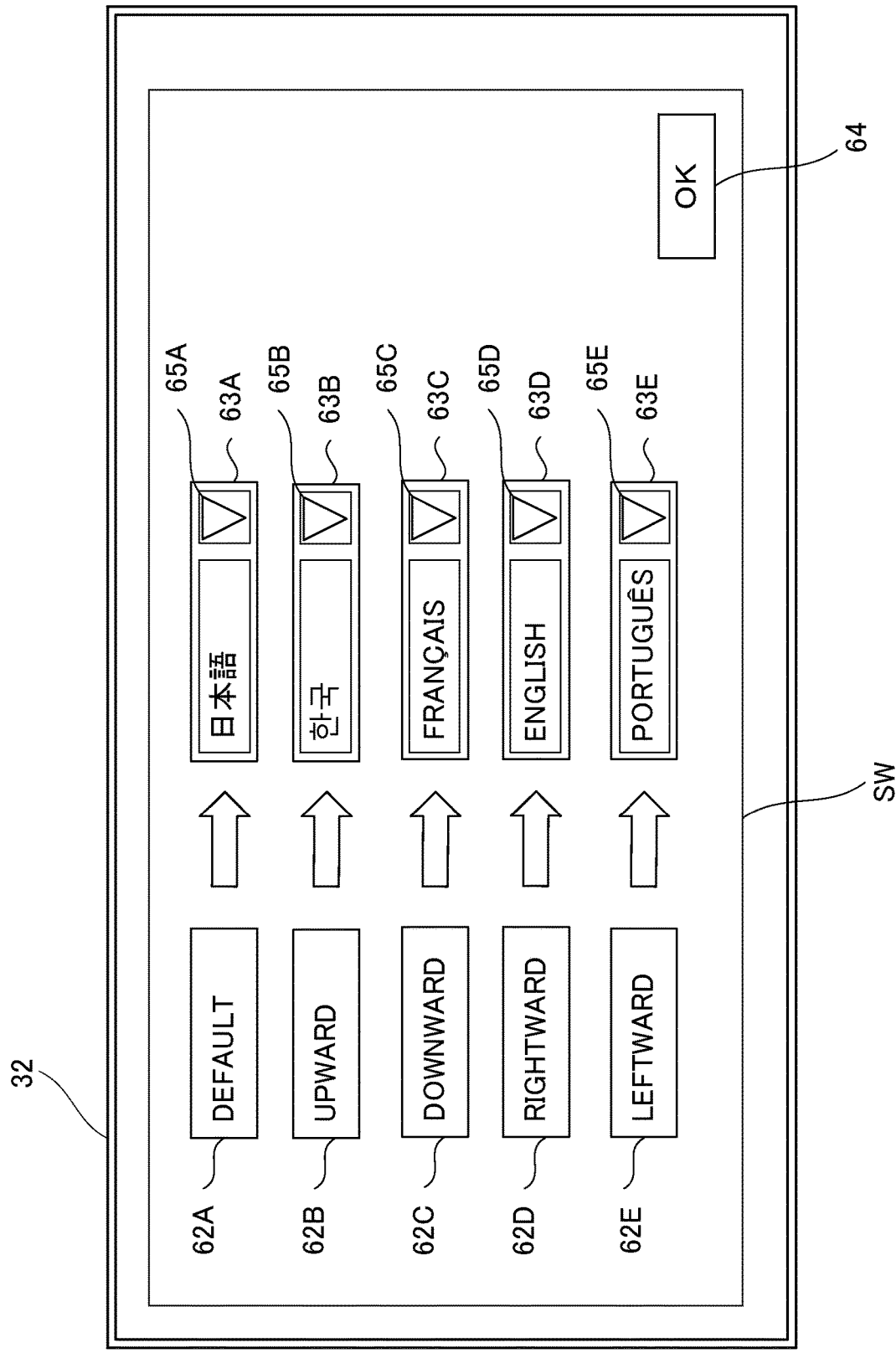

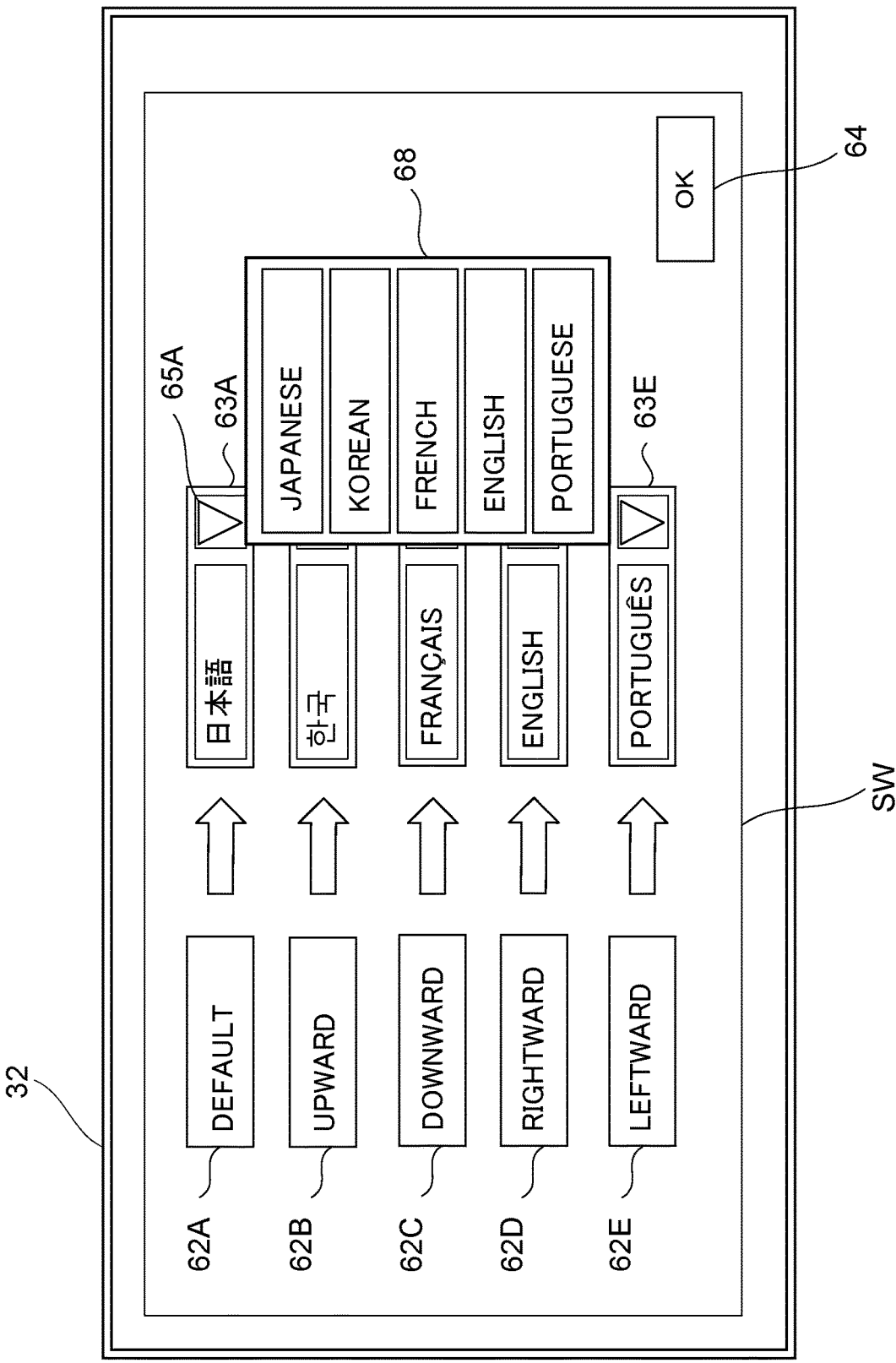

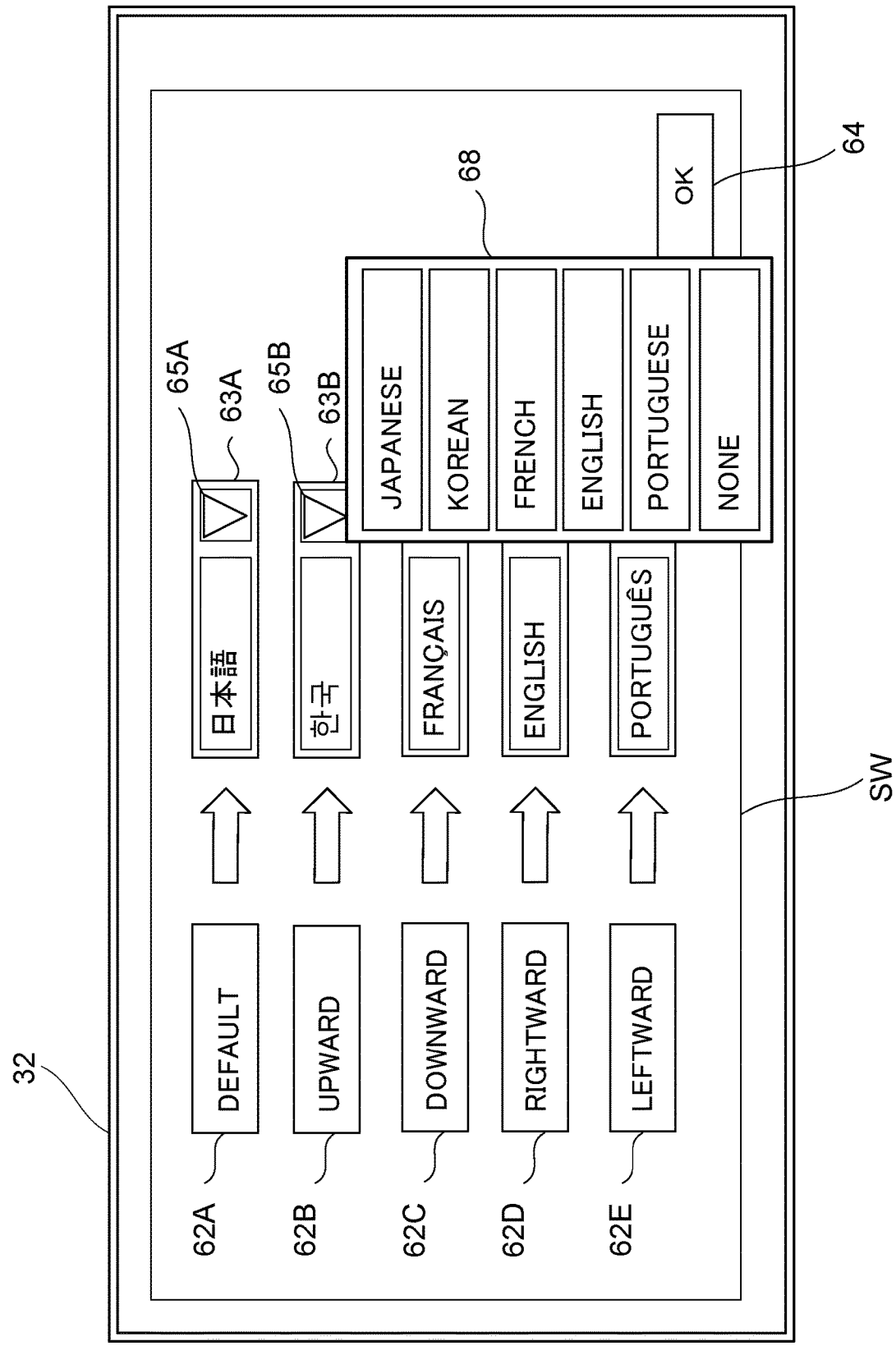

IMAGE FORMING APPARATUS

TECHNICAL FIELD

The present invention relates to an image forming apparatus, and more particularly to a technique to switch a language of a character or character string, displayed on a display unit.

BACKGROUND ART

Some image forming apparatuses are configured to switch the language of a character or character string, displayed on a display unit. Such image forming apparatuses are disclosed, for example, in Patent Literature (PTL) 1 and PTL 2. According to PTL 1, various languages are periodically displayed by turns, on the screen of the display unit, and when the user operates the apparatus at the time that the language familiar to the user is displayed, that language is thereafter displayed on the screen of the display unit. According to PTL 2, a plurality of language keys are displayed on the display unit, and while the user presses a desired language key, the corresponding language is displayed on the display unit.

CITATION LIST

Patent Literature

[PTL 1] Japanese Unexamined Patent Application Publication No. 2006-15623
[PTL 2] Japanese Unexamined Patent Application Publication No. 2011-61590

SUMMARY OF INVENTION

With the technique according to PTL 1, however, once the language to be displayed is determined, that language continues to be displayed thereafter. Therefore, in the case where a plurality of users who use different languages are sharing the image forming apparatus, the screen for switching the language has to be invoked each time the user is changed, which forces the user to perform a troublesome operation. Besides, in the case where the user is unfamiliar with the language being displayed, the user is unable to find out how to invoke the screen for switching the language. With the technique according to PTL 2, the plurality of language keys are displayed on the screen of the display unit, which makes it difficult to secure a sufficient space on the screen, for displaying other types of keys and checkboxes.

The present invention has been accomplished in view of the foregoing situation, and provides a technique to allow the language being displayed to be switched for a desired period of time, through a simple operation without the need to provide a special key for switching the language.

In an aspect, the present invention provides an image forming apparatus including a display unit, a touch panel provided in the display unit, a storage unit containing, by each of a plurality of languages respectively associated with each direction of slide operations that are performed on the touch panel and are different from each other, a character or character string to be displayed on the display unit, and a controller configured to cause the display unit to display, on a screen, an instruction-receiving image to be touched through the touch panel, detect, when a slide operation is performed on a non-operational region where the instruction-receiving image is not located, a direction of the slide operation, and retrieve the character or character string of the language associated with the detected direction of the slide operation, from the storage unit, and cause the display unit to display, for a predetermined period of time, a selected-language window formed by substituting the character or character string displayed on the screen of the display unit, with the character or character string retrieved from the storage unit.

Advantageous Effects of Invention

The mentioned configuration allows the language being displayed to be switched for a desired period of time, through a simple operation without the need to provide a special key for switching the language.

BRIEF DESCRIPTION OF DRAWINGS

FIG. 4 is a schematic drawing of a language table used to display the GUI and the selected-language window.
FIG. 10 is a schematic drawing showing a language setting window displayed on the screen of the display unit.
FIG. 11A and FIG. 11B are schematic drawings each showing an operation status of the language setting window.

DESCRIPTION OF EMBODIMENTS

Hereafter, an embodiment of the present invention will be described, with reference to the drawings.

Figure 1:
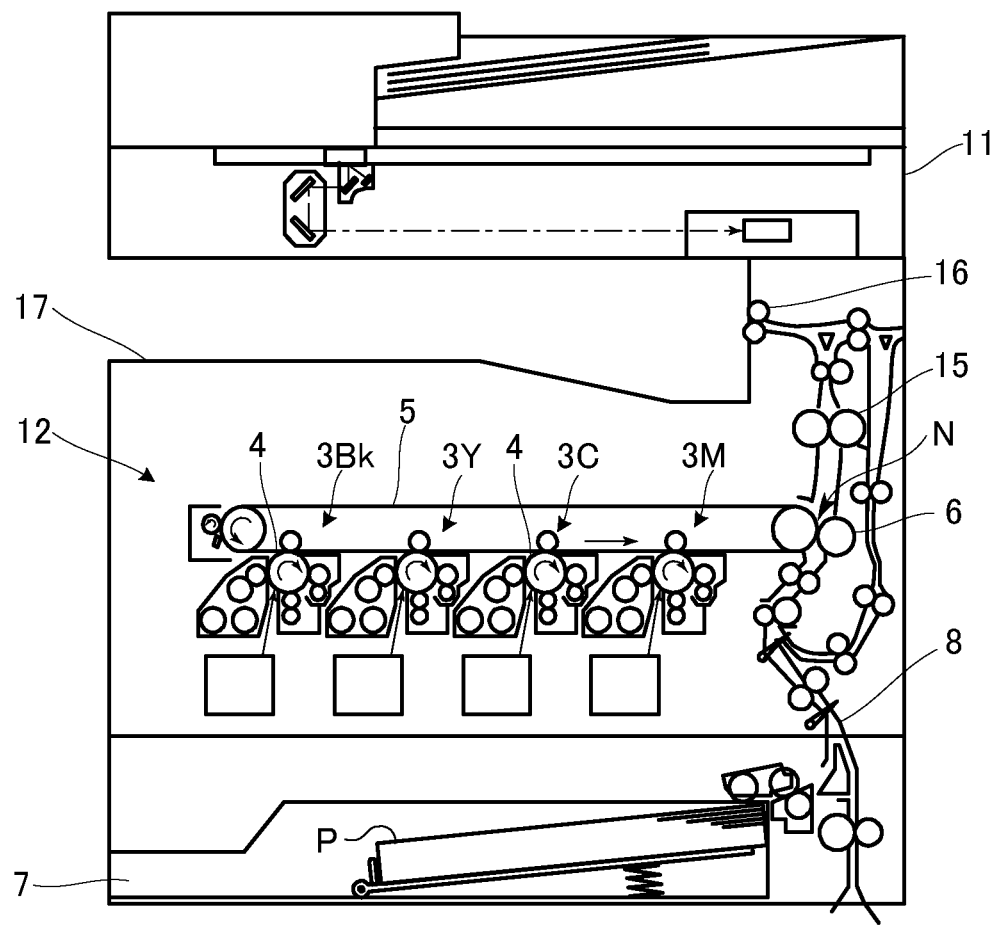
FIG. 1 is a cross-sectional view showing an image forming apparatus according to an embodiment of the present invention.

FIG. 1 is a cross-sectional view showing an image forming apparatus according to an embodiment of the present invention. The image forming apparatus 10 according to the embodiment includes an image reading unit 11 and an image forming unit 12.

The image reading unit 11 includes a scanner for optically reading a source document, and generates image data representing the image of the source document.

The image forming unit 12 is configured to print, on a recording sheet, an image based on the image data generated by the image reading unit 11, and includes an image forming subunit 3M for magenta, an image forming subunit 3C for cyan, an image forming subunit 3Y for yellow, and an image forming subunit 3Bk for black. In each of the image forming subunits 3M, 3C, 3Y, and 3Bk, the surface of a photoconductor drum 4 is uniformly charged, and an electrostatic latent image is formed on the surface of the photoconductor drum 4 by exposure. Then the electrostatic latent image on the surface of the photoconductor drum 4 is developed into a toner image, and the toner image on the photoconductor drum 4 is transferred to an intermediate transfer roller 5. Thus, the color toner image is formed on the intermediate transfer roller 5. The color toner image is secondarily transferred to the recording sheet P transported along a transport route 8 from a paper feed unit 7, at a nip region N defined between the intermediate transfer roller 5 and a secondary transfer roller 6.

Thereafter, the recording sheet P is press-heated in a fixing device 15, so that the toner image on the recording sheet P is fixed by thermal compression, and then the recording sheet P is discharged to an output tray 17 through a discharge roller pair 16.

Figure 2:
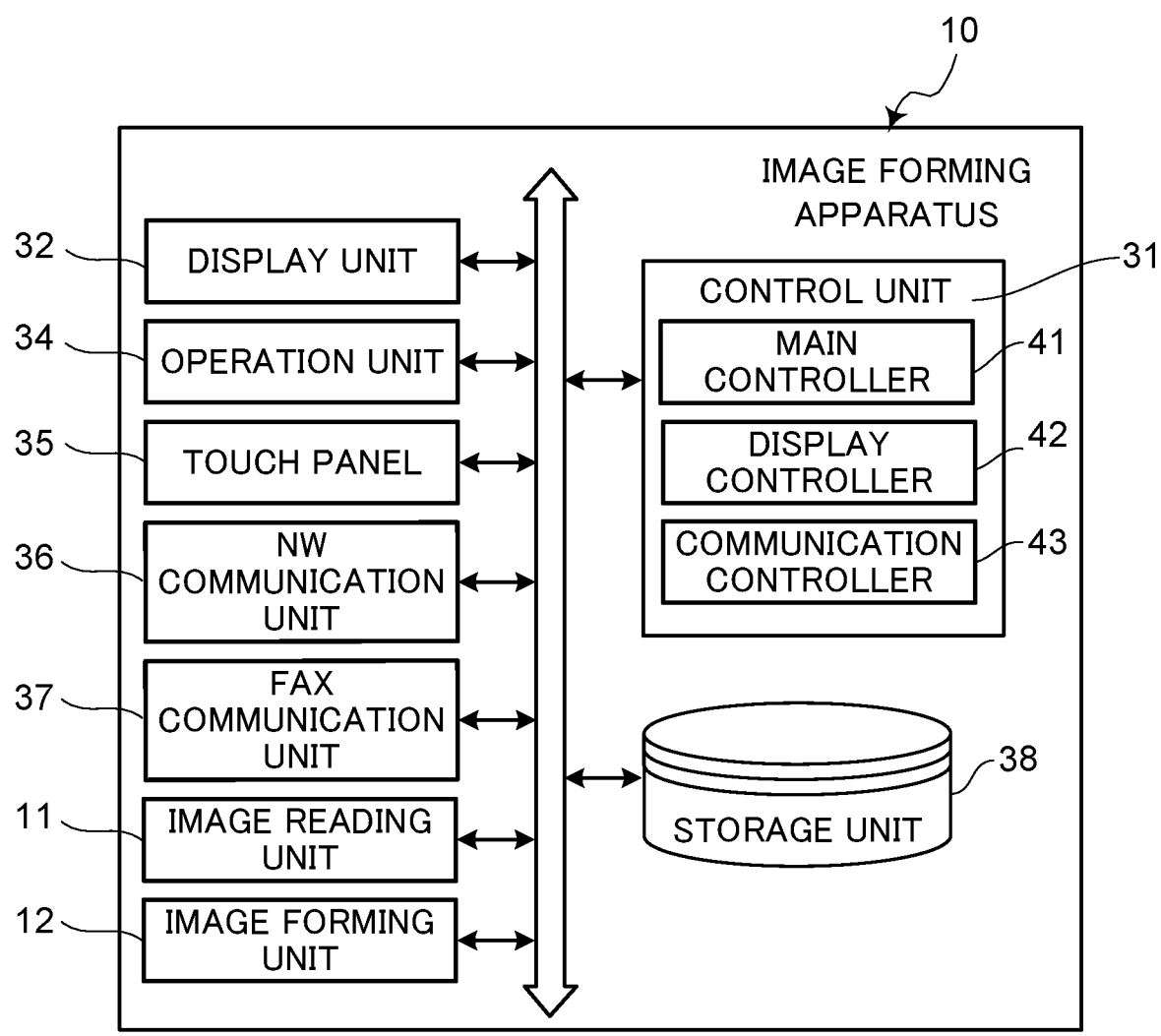
FIG. 2 is a block diagram showing a configuration of the image forming apparatus according to the embodiment.

FIG. 2 is a functional block diagram showing an essential internal configuration of the image forming apparatus 10. As shown in FIG. 2, the image forming apparatus 1 includes a control unit 31, a display unit 32, an operation unit 34, a touch panel 35, a network (NW) communication unit 36, a facsimile (FAX) communication unit 37, a storage unit 38, the image reading unit 11, and the image forming unit 12. The mentioned components are configured to transmit and receive data or signals to and from each other, via a bus.

The display unit 32 may be constituted of a liquid crystal display (LCD) or an organic light-emitting diode (OLED) display.

The operation unit 34 includes arrow keys for moving, for example, a focus in a graphical user interface (hereinafter abbreviated as GUI) displayed on the screen of the display unit 32, an enter key for confirming the operation with respect to the GUI, s start key, and so forth.

The touch panel 35 is overlaid on the screen of the display unit 32. The touch panel 35 is based on a resistive film or electrostatic capacitance, and configured to detect a contact (touch) of the user's finger, along with the touched position, to input the user's instruction to the GUI on the screen of the display unit 32. Accordingly, the touch panel 35 serves as an operation unit for inputting the user's operation performed on the screen of the display unit 32.

The NW communication unit 36 transmits and receives various data to and from non-illustrated other terminal devices, through a network N. The FAX communication unit 37 transmits and receives image data to and from non-illustrated other image forming apparatuses or facsimile machines, through the network N.

The storage unit 38 includes a RAM, a large-capacity hard disk drive (HDD) or a similar storage device, and contains various data and programs.

The control unit 31 includes a processor, a random-access memory (RAM), a read-only memory (ROM), and so forth. The processor is, for example, a central processing unit (CPU), a MPU, an ASIC, or the like. The control unit 31 acts as a main controller 41, a display controller 42, and a communication controller 43, when the processor executes a program stored in the ROM or the storage unit 38. Here, the mentioned components of the control unit 31 may each be constituted in the form of a hardware circuit, instead of being performed according to the program. In addition, the main controller 41, the display controller 42, and the communication controller 43 correspond to the "controller" in the disclosure.

The main controller 41 serves to control the overall operation of the image forming apparatus 10. The display controller 42 controls the display unit 32 so as to display the GUI, images for receiving a user's instruction, and various types of information on the screen. The communication controller 43 is configured to control the communication operation of the NW communication unit 36 and the FAX communication unit 37.

When the user operates the operation unit 34 and the touch panel 35 to select one of the facsimile function, the copying function, the printing function, and the scanning function, in response to a display on the display unit 32, such as the image for receiving the instruction or other types of information, the image forming apparatus 10 configured as above executes the job related to a selected function. For example, when the user selects the copying function and inputs the instruction to execute the job utilizing the copying function, the main controller 41 causes the image reading unit 11 to read a source document image, and causes the image forming unit 12 to print the source document image on the recording sheet. In the case of the facsimile function, the printing function, and the scanning function, likewise, when the user selects the function and inputs the instruction to execute the job utilizing the selected function, the main controller 41 executes the designated job.

In the image forming apparatus 10, in addition, when the user operates, for the execution of the selected job, the GUI displayed on the screen of the display unit 32 through the touch panel 35, to input setting items and instructions, the main controller 41 receives such inputs. The main controller 41 executes the job, according to the details of the setting items and instructions inputted through the operation of the GUI.

In the case where a plurality of users who use different languages from each other are sharing the image forming apparatus 10, all the users can easily utilize the image forming apparatus 10, if the language displayed in the GUI can be easily switched, each time the user changes.

In this embodiment, to enable the above, when the user performs a slide operation on a non-operational region on the screen of the display unit 32 through the touch panel 35, first the main controller 41 detects the direction of the slide operation. The display controller 42 generates a selected-language window, by substituting the character or character string in the GUI on the screen of the display unit 32, with a character or character string of the language associated with the direction of the slide operation, and causes the display unit 32 to display the selected-language window, only for a predetermined period of time. Here, the non-operational region refers to a region where instruction-receiving images for receiving the instruction from the user, such as a key, a check box, and a text box displayed on the screen of the display unit 32, are not located.

It will hereinafter be assumed, as an example, that the display controller 42 has set a character or character string in Japanese as default in the GUI, and has defined upward, downward, rightward, and leftward directions as the directions of the slide operations to be performed on the non-operational region on the screen of the display unit 32. It will also be assumed that the display controller 42 holds a memory of the association between the upward, downward, rightward, and leftward slide operations and the respective languages, such that the upward operation corresponds to Korean, the downward operation corresponds to French, the rightward operation corresponds to English, and the leftward operation corresponds to Portuguese.

In this case, when the user performs an upward slide operation on the non-operational region, the main controller 41 detects the direction of the slide operation. Then the display controller 42 generates the selected-language window, by substituting the Japanese character or character string in the GUI with the Korean character or character string associated with the detected direction of the slide operation, and causes the display unit 32 to display the selected-language window, only for the predetermined period of time.

Likewise, when the user performs a downward, rightward, or leftward slide operation on the non-operational region, the main controller 41 detects the direction of the slide operation. Then the display controller 42 generates the selected-language window, by substituting the Japanese character or character string in the GUI, which is the default display, with the French, English, or Portuguese character or character string associated with the detected direction of the slide operation, and causes the display unit 32 to display the selected-language window, only for the predetermined period of time.

With the mentioned arrangement, the user can cause the display unit 32 to display the selected-language window, formed by substituting the character or character string in the GUI with the character or character string of the language familiar to the user, simply by performing a slide operation on the non-operational region on the screen of the display unit 32, in the direction associated with the desired language, to thereby easily understand the character or character string displayed in the GUI.

In the foregoing arrangement, the display controller 42 only substitutes the character or character string, leaving the common background unchanged, to generate a window image of another language that is different from the default language. Alternatively, images of the respective selected-language windows of other languages may be stored in the storage unit 38, and the display controller 42 may retrieve the image representing the selected-language window of the language corresponding to the direction of the slide operation from the storage unit 38, instead of substituting the portion of the character or character string, and cause the display unit 32 to display the retrieved image.

Hereunder, the process for displaying the GUI will be described.

Figure 3:
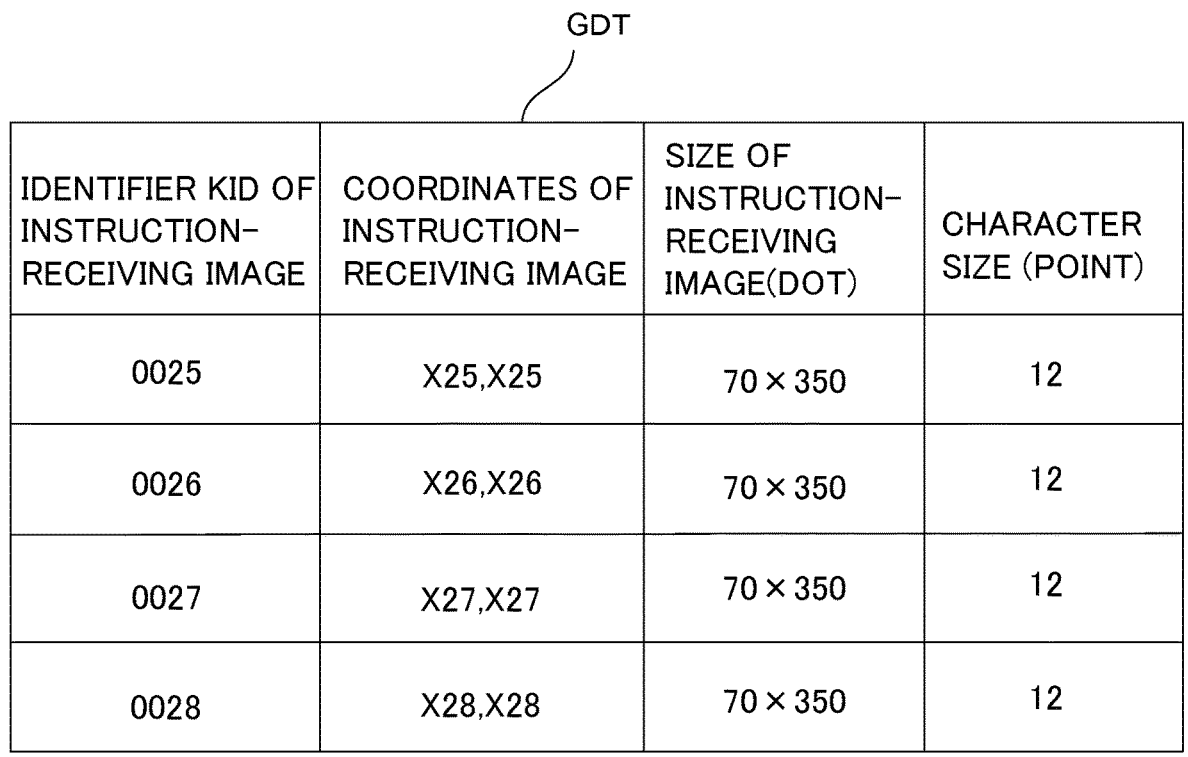
FIG. 3 is a schematic drawing of an instruction-receiving image table used to display a GUI and a selected-language window.

FIG. 3 is a schematic drawing of an instruction-receiving image table DT used to display the GUI and the selected-language window. FIG. 4 is a schematic drawing of a language table LDT used to display the GUI and the selected-language window.

As shown in FIG. 3, the instruction-receiving image table GDT contains, with respect to each of the instruction-receiving images displayed on the screen of the display unit 32, an identifier KID of the instruction-receiving image, a display position (coordinate) of the instruction-receiving image, a size of the instruction-receiving images and a size of the character or character string to be displayed in the instruction-receiving image, in association with each other. The display position of the instruction-receiving image refers to the display position on the screen of the display unit 32. The size of the character or character string refers to the size (point) of the character or character string superimposed on the instruction-receiving image.

Referring to FIG. 4, the language table LDT contains, with respect to each of the instruction-receiving images, the identifier KID of the instruction-receiving image, and the character or character string to be displayed in the instruction-receiving image, namely the Japanese character or character string, the Korean character or character string, the French character or character string, the English character or character string, or the Portuguese character or character string, in association with the corresponding instruction-receiving image. In the language table LDT, further, the default language and the other languages are registered, in association with the upward, downward, rightward, and leftward directions of the slide operation.

The display controller 42 retrieves, from the instruction-receiving image table GDT shown in FIG. 3, the size of the character or character string associated with the identifier KID of the instruction-receiving image, with respect to each of the instruction-receiving images, and also retrieves the character or character string of the default language associated with the identifier KID of the instruction-receiving image, from the language table LDT shown in FIG. 4. Then the display controller 42 generates the character or character string of the default language thus retrieved, in the size of the retrieved character or character string, and displays the generated character or character string of the default language, so as to be included in the instruction-receiving image on the screen of the display unit 32. Accordingly, the GUI in which the plurality of instruction-receiving images are located in the respective positions, and the corresponding character or character string of the default language is superimposed on each of the instruction-receiving images, is displayed on the screen of the display unit 32.

Figure 5:
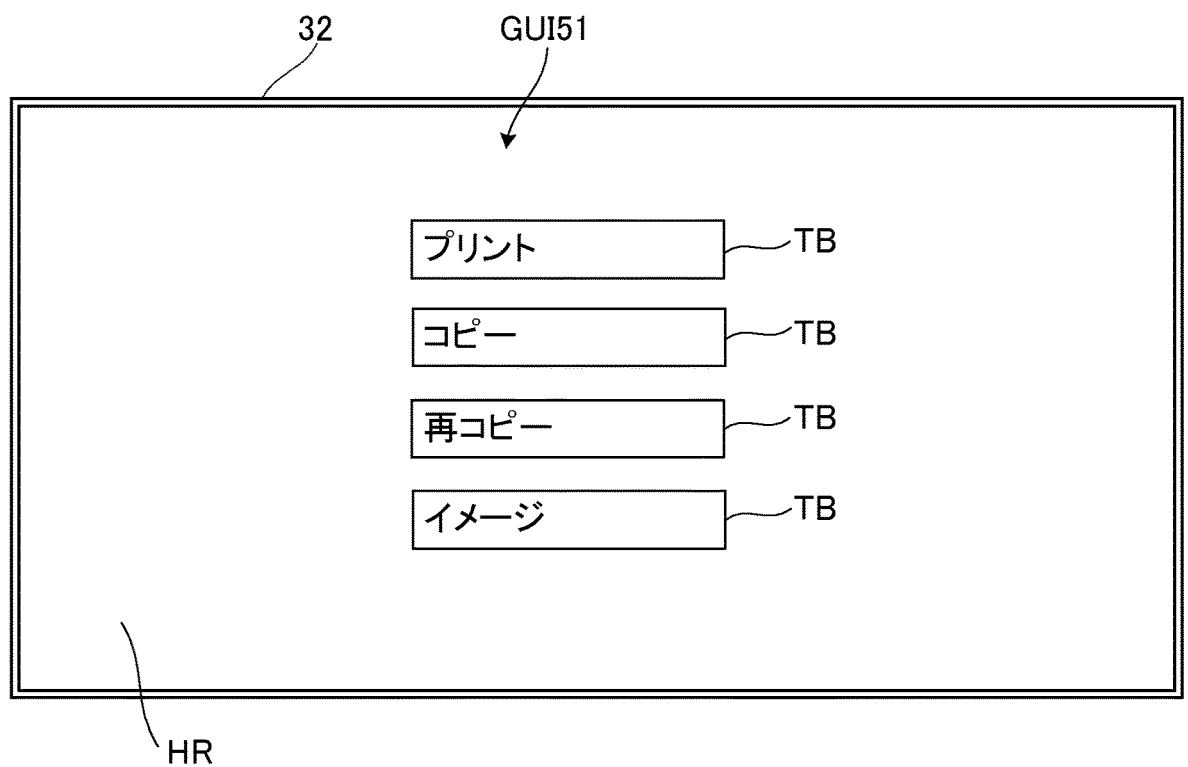
FIG. 5 is a schematic drawing showing the GUI displayed on the screen of a display unit.

FIG. 5 is a schematic drawing showing the GUI, expressed as a screen displayed on the display unit 32. As shown in FIG. 5, the GUI 51 on the screen of the display unit 32 includes a plurality of text boxes TB each serving as the instruction-receiving image, and the corresponding character or character string of the default language, namely Japanese, superimposed on each of the instruction-receiving images. The GUI 51 also includes a non-operational region HR, where the instruction-receiving images are not located.

Now, when the user touches one of the instruction-receiving images in the GUI on the screen of the display unit 32, the main controller 41 detects the coordinate of the touched position through the touch panel 35, and identifies the coordinate of the instruction-receiving image displayed at the touched position. The main controller 41 then executes the operation associated with the instruction-receiving image displayed at the touched position. For example, when the instruction-receiving image TB displayed at the touched position corresponds to "print", the main controller 41 executes a printing job, associated with the instruction-receiving image TB representing the printing job.

Figure 6:
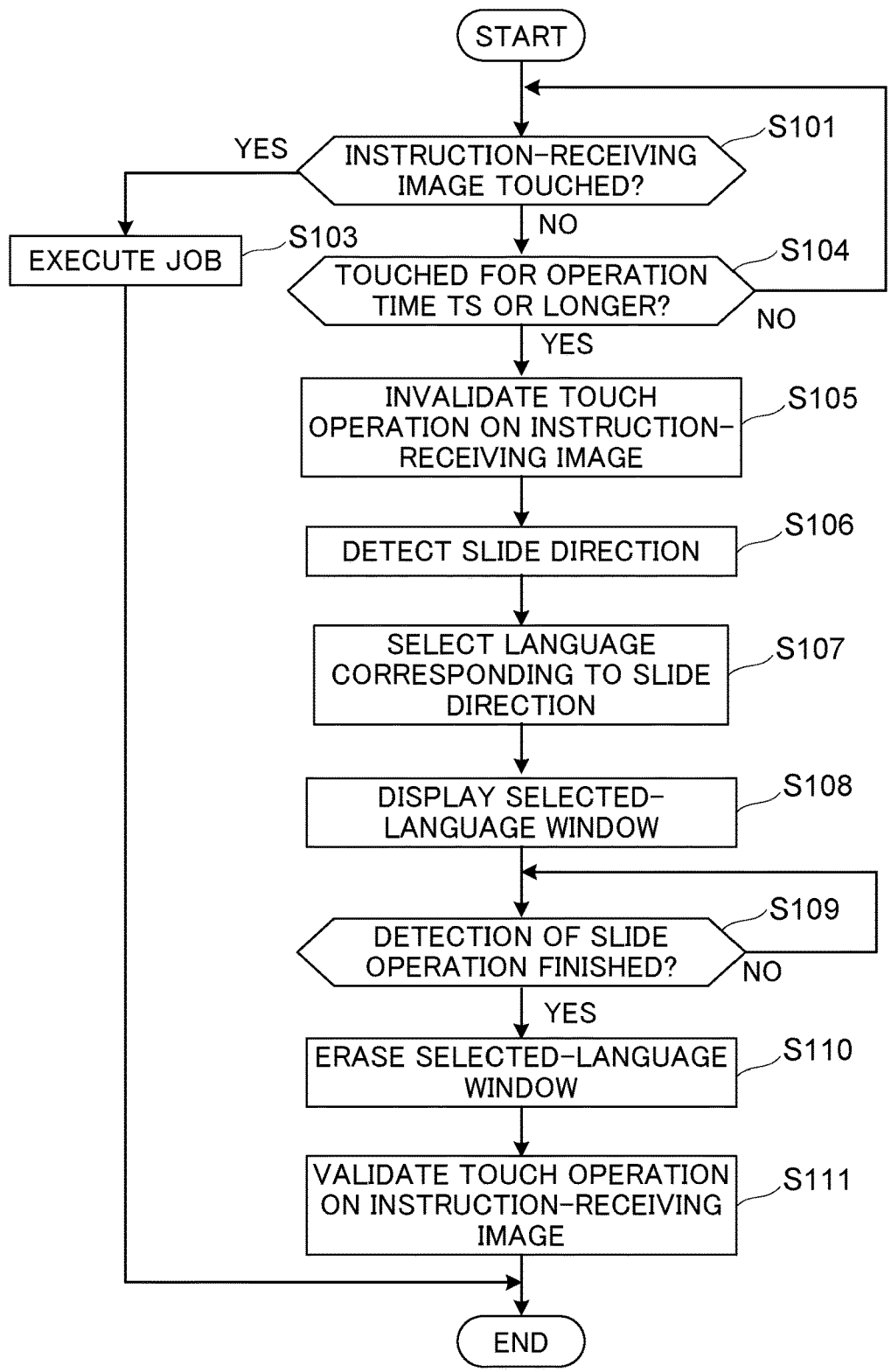
FIG. 6 is a flowchart showing a process for displaying the selected-language window.

Referring now to the flowchart of FIG. 6, a process for obtaining the display of the selected-language window through the GUI will be described hereunder.

The main controller 41 decides whether a touch operation has been performed on the text box TB serving as the instruction-receiving image, or on the non-operational region HR, for example when the GUI 51 shown in FIG. 5 is displayed on the screen of the display unit 32 (S101). The main controller 41 detects the coordinate of the touched position through the touch panel 35 and, as described above, identifies the instruction-receiving image displayed at the detected coordinate position, on the basis of the display positions of the respective instruction-receiving images registered in the instruction-receiving image table GDT (Yes at S101), to execute the job corresponding to the instruction-receiving image displayed at the touched position (S103).

When the main controller 41 fails to identify an instruction-receiving image at the detected coordinate position (No at S101), the main controller 41 assumes that the detected coordinate is included on the non-operational region HR, and decides whether the coordinate of the touched position is continuously detected through the touch panel 35, for a predetermined operation time TS or longer (S104).

When main controller 41 decides that the coordinate of the touched position has not been continuously detected for the predetermined operation time TS (No at S104), the operation returns to S101. When main controller 41 decides that the coordinate of the touched position has been continuously detected for the predetermined operation time TS or longer (Yes at S104), the main controller 41 invalidates the touch operation performed on the instruction-receiving images in the GUI 51 (S105). In other words, the main controller 41 does not execute the job associated with the instruction-receiving image, despite having received a touch operation on any of the instruction-receiving images, through the touch panel 35.

For example, when the user is unable to understand the character or character string in the language displayed in the GUI 51, the user can touch a desired position on the non-operational region HR for equal to or longer than the predetermined operation time TS, and then perform a slide operation in the direction associated with the language familiar to the user, out of the registered languages other than the default language displayed at this time on the display unit 32. Here, it will be assumed, as an example, that the user has touched a desired position on the non-operational region HR for equal to or longer than the predetermined operation time TS, and performed a slide operation in the rightward direction, which corresponds to English.

At this point, the main controller 41 identifies the direction in which the touch operation slides (direction of the slide operation), for example according to the positional transition of the touched position with the lapse of time (S106). In the mentioned example, the main controller 41 identifies that the slide operation has been performed in the rightward direction (S106), looks up the language table LDT shown in FIG. 4 to thereby select English corresponding to the rightward slide operation (S107), and instructs the display controller 42 to generate the selected-language window, by substituting the Japanese character or character string in the GUI 51 with the English character or character string. When the slide operation is performed, even though the coordinate of the touched position detected through the touch panel 35 overlaps with any of the instruction-receiving image, the touch operation performed on the instruction-receiving images has been invalidated at S105. Therefore, the main controller 41 is kept from executing the job corresponding to the instruction-receiving image that has been touched.

Figure 7:
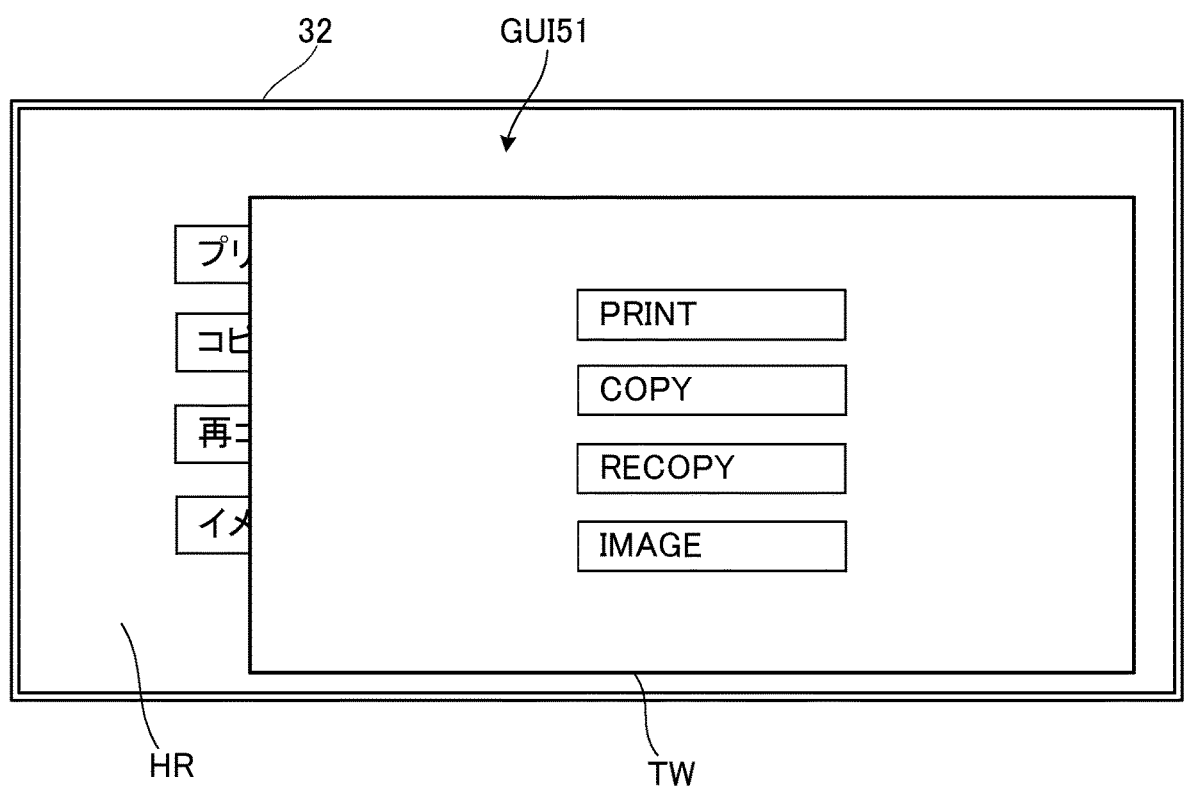
FIG. 7 is a schematic drawing showing the selected-language window displayed on the screen of the display unit.

Upon receipt of the instruction to generate the selected-language window, the display controller 42 looks up the instruction-receiving image table GDT shown in FIG. 3 and the language table LDT shown in FIG. 4, to generate a selected-language window TW shown in FIG. 7 in a reduced size compared with the GUI 51 shown in FIG. 5, by substituting the Japanese character or character string in the GUI 51 with the character or character string of the language selected at S107, namely English, and causes the display unit 32 to display the selected-language window TW on the screen (S108).

More specifically, the display controller 42 first generates the selected-language window TW, for example in the size reduced to 80% of the GUI 51, and looks up the instruction-receiving image table GDT shown in FIG. 3, to thereby generate the instruction-receiving images each associated with the function in the registered size. Then the generated instruction-receiving images are also reduced to 80%, and the coordinates of the respective instruction-receiving images in the GUI 51 are transferred to the corresponding coordinates in the selected-language window TW, so as to locate the reduced instruction-receiving images at the respective coordinates transferred to the selected-language window TW.

The display controller 42 also retrieves the size of the character or character string associated with each of the instruction-receiving images, from the instruction-receiving image table GDT shown in FIG. 3, and reduces the size of the character or character string to 80%. Further, the display controller 42 retrieves the character or character string of the language associated with the instruction-receiving image, namely English, from the language table LDT shown in FIG. 4, to generate the English character or character string in the reduced size, superimposes the English character or character string thus generated, on the instruction-receiving image in the selected-language window TW.

Through the mentioned process, the selected-language window TW, reduced to 80% of the GUI 51, and formed by substituting the Japanese character or character string in the GUI 51 with the English character or character string, is displayed on the screen of the display unit 32, as shown in FIG. 7. The selected-language window TW is different from the GUI 51, only in the language of the character or character string.

The user can understand, in view of the English character or character string superimposed on each of the instruction-receiving images in the selected-language window TW, what those characters or character strings refer to.

After the selected-language window TW is displayed on the screen of the display unit 32, the main controller 41 decides, through the touch panel 35, whether the slide operation is still continued, or the end position of the slide operation has been detected (S109). Upon deciding that either the continuation of the slide operation, or the end position of the slide operation has been detected (Yes at S109), the main controller 41 causes the display controller 42 to maintain the display of the selected-language window TW. In the case where the main controller 41 decides that neither of the continuation of the slide operation and the end position of the slide operation has been detected (No at S109), the main controller 41 causes the display controller 42 to finish the display of the selected-language window TW, and display the GUI 51 shown in FIG. 5 again, on the screen of the display unit 32 (S110). At this point, the main controller 41 validates the touch operation on each of the instruction-receiving images in the GUI 51 (S111). Thus, the main controller 41 is enabled to execute, upon detecting a touch operation on one of the instruction-receiving images through the touch panel 35, the job associated with the instruction-receiving image that has been touched.

Because of the mentioned operation, as long as the user is continuing with the slide operation on the screen of the display unit 32, or is still touching the end position of the slide operation after stopping the sliding motion, the selected-language window TW (screen displaying the language selected by the user) is kept displayed on the screen of the display unit 32. When the user finishes the slide operation, and removes the finger from the end position of the slide operation, the display of the selected-language window TW is erased, and the GUI 51 (screen displaying the default language) is again displayed, so that the touch operation on the instruction-receiving image is validated.

Here, for example, when the user touches a desired position on the non-operational region HR for equal to or longer than the predetermined operation time TS, and successively performs an upward slide operation corresponding to Korean, the selected-language window TW, reduced to 80% of the GUI 51 shown in FIG. 5, and in which the Japanese character or character string in the GUI 51 is substituted with the Korean character or character string, is displayed.

Likewise, for example, when the user touches a desired position on the non-operational region HR for equal to or longer than the predetermined operation time TS, and successively performs a downward slide operation corresponding to French, the selected-language window TW, reduced to 80% of the GUI 51 shown in FIG. 5, and in which the Japanese character or character string in the GUI 51 is substituted with the French character or character string, is displayed.

Further, for example, when the user touches a desired position on the non-operational region HR for equal to or longer than the predetermined operation time TS, and successively performs a leftward slide operation corresponding to Portuguese, the selected-language window TW, reduced to 80% of the GUI 51 shown in FIG. 5, and in which the Japanese character or character string in the GUI 51 is substituted with the Portuguese character or character string, is displayed.

In all of the mentioned cases, the display controller 42 causes the display unit 32 to display the selected-language window TW, only for the period during which the slide operation, or the end position of the slide operation continues to be detected through the touch panel 35.

Thus, when the user touches a desired position on the non-operational region HR for equal to or longer than the predetermined operation time TS, and successively performs an upward, downward, rightward, or leftward slide operation, the main controller 41 detects the slide direction, and the display controller 42 causes the display unit 32 to display the selected-language window TW, generated by substituting the Japanese character or character string, which is the default, with the character or character string of the language corresponding to the direction of the slide operation performed by the user. Therefore, the user can attain, through a simple operation, the display of the selected-language window, in which the character or character string in the GUI 51 is substituted with the character or character string of the language familiar to the user, and easily understand the character or character string in the GUI 51.

The instruction-receiving image table GDT shown in FIG. 3 and the language table LDT shown in FIG. 4 are made up for each of a plurality of GUIs and stored in the storage unit 38, so that the main controller 41 selects one of the GUIs as appropriate, and the display controller 42 looks up the instruction-receiving image table GDT and the language table LDT corresponding to the selected GUI, and causes the display unit 32 to display the GUI on the screen. Accordingly, the GUI appropriate for the operating or processing status of the image forming apparatus 10 is displayed on the screen of the display unit 32, so as to enable the user to operate the image forming apparatus 10 through the GUI.

Whichever of the GUIs is displayed, when the user touches a desired position on the non-operational region HR for equal to or longer than the predetermined operation time TS, and successively performs an upward, downward, rightward, or leftward slide operation, the main controller 41 detects the slide direction. Then the display controller 42 looks up the instruction-receiving image table GDT and the language table LDT corresponding to the GUI, generates the selected-language window TW by substituting the Japanese character or character string with the character or character string of the language corresponding to the direction of the slide operation performed by the user, and causes the display unit 32 to display the selected-language window TW on the screen.

Further, among the language tables LDT made up for the respective GUIs, the default language is commonly designated, and other languages are also commonly designated, with respect to each of the upward, downward, rightward, and leftward slide operations. Therefore, in all of the GUIs, the Japanese character or character string is displayed as default, and the selected-language window TW formed by substituting the Japanese character or character string with the Korean, French, English, or Portuguese character or character string, according to the upward, downward, rightward, or leftward slide operation respectively, is generated and displayed.

In this embodiment, the user can change the default language, or change the correspondence between the upward, downward, rightward, and leftward slide operations and the languages. A process for making such changes will be described hereunder, with reference to the flowchart of FIG. 8 and other drawings.

Figure 9:
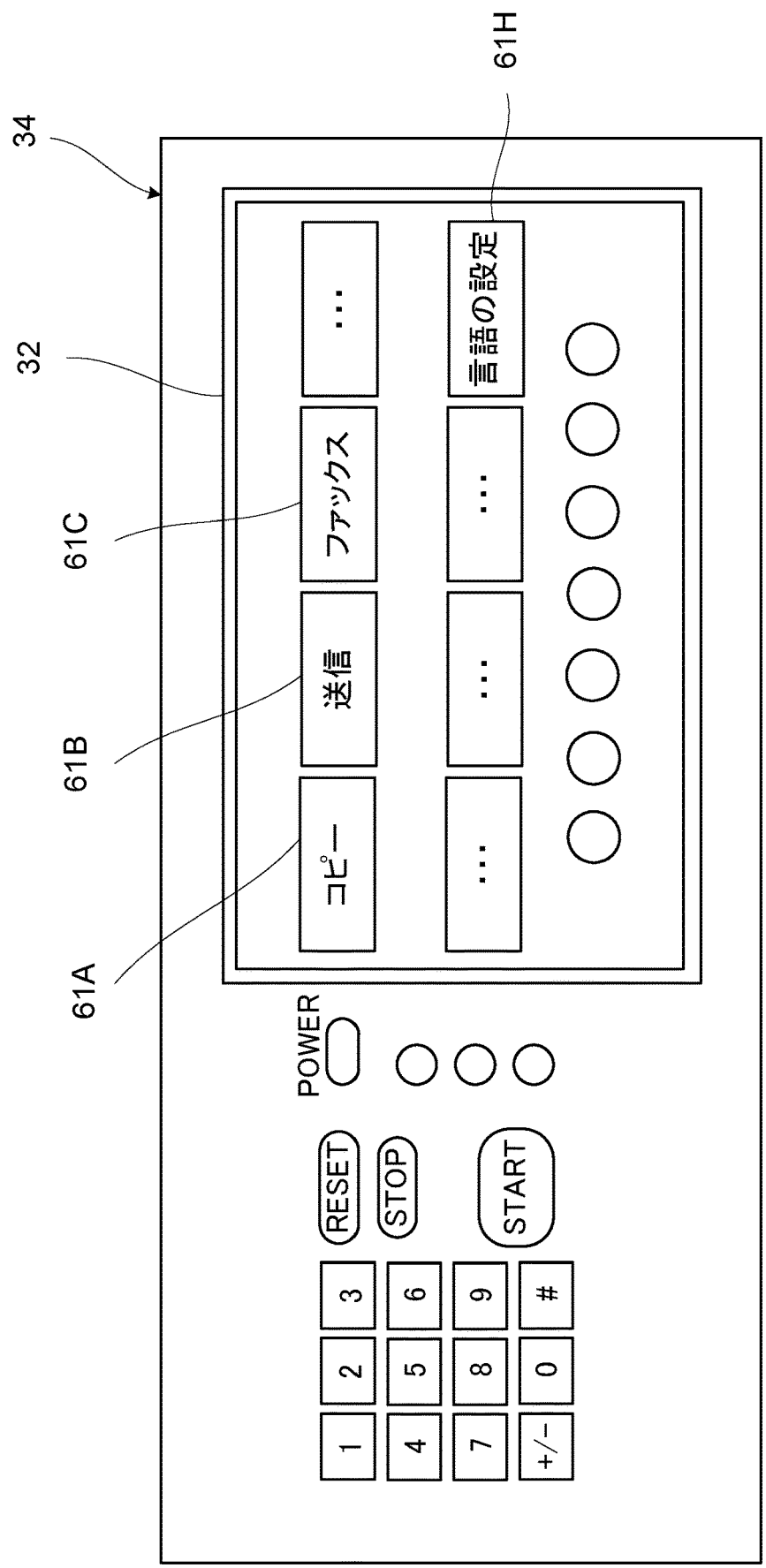
FIG. 9 is a schematic drawing showing an initial screen displayed on the display unit.

First, the display controller 42 causes the display unit 32 of the image forming apparatus 10 to display, as shown in FIG. 9, an initial screen including a plurality of touch keys 61A to 61H, respectively associated with the functions. When the user touches the touch key 61H for setting the language, the main controller 41 detects the touch operation performed on the touch key 61H through the touch panel 35, and causes the display unit 32, through the display controller 42, to display a language setting window SW for selecting the language on the screen, as shown in FIG. 10 (S201).

The language setting window SW includes display fields 62A to 62E respectively marked as Default, and Upward, Downward, Rightward, and Leftward, switch boxes 63A to 63E, and an OK key 64. The switch boxes 63A to 63E each represent the corresponding language, and respectively include keys 65A to 65E.

On this screen, the user can set the default language, by touching the switch box 63A corresponding to the display field 62A marked as Default. In addition, the user can set the language corresponding to the upward slide operation, by touching the switch box 63B corresponding to the display field 62B marked as Upward. Likewise, the user can set the language corresponding to the downward, rightward, or leftward slide operation, by touching one of the switch boxes 63C to 63E corresponding to the display fields 62C to 62E respectively marked as Downward, Rightward, and Leftward.

For example, when the user touches the pull-down key 65A of the switch box 63A corresponding to the display field 62A marked as Default, the main controller 41 detects the touch operation performed on the pull-down key 65A through the touch panel 35 (S202), and receives the touch operation (S203 "Default"). The display controller 42 then displays, in response to the touch operation performed on the pull-down key 65A, a pull-down menu 68 in which Japanese, Korean, French, English, and Portuguese are aligned in the up-down direction, under the key 65A as shown in FIG. 11A (S204).

When the user touches one of the images representing the language in the pull-down menu 68, the main controller 41 confirms the language represented by the image displayed at the touched position, through the touch panel 35, and registers the Default in association with the confirmed language, in the language table LDT shown in FIG. 4 (S205).

When the user touches the pull-down key 65B of the switch box 63B corresponding to the display field 62B marked as Upward, the main controller 41 detects the touch operation performed on the pull-down key 65B through the touch panel 35 (S203 "Upward"). The display controller 42 then displays, in response to the touch operation performed on the pull-down key 65B, the pull-down menu 68 in which Japanese, Korean, French, English, Portuguese, and None are aligned in the up-down direction, under the key 65B as shown in FIG. 11B (S206).

Then, when the user touches one of the images representing the language in the pull-down menu 68, the main controller 41 confirms the language represented by the image displayed at the touched position, through the touch panel 35, and registers the Upward in association with the confirmed language, in the language table LDT shown in FIG. 4 (S207).

Here, when the user touches the image representing "None" in the pull-down menu 68, the main controller 41 registers no language in association with Upward. In this case, although the user touches a desired position on the non-operational region HR in the GUI 51 for equal to or longer than the predetermined operation time TS, and successively performs an upward slide operation so that the main controller 41 detects the slide direction, the display controller 42 does not allow the display unit 32 to display the selected-language window TW in which the language is substituted, but causes the display unit 32 to display the GUI 51 including the Japanese character or character string, which is the default.

In addition, when the user touches the pull-down key 65C of the switch box 63C corresponding to the display field 62C marked as Downward, the main controller 41 detects the touch operation performed on the pull-down key 65C through the touch panel 35 (S203 "Downward"), and the display controller 42 displays the pull-down menu 68 under the key 65C, in response to the touch operation performed on the pull-down key 65C (S208). Then, when the user touches one of the images representing the language or "None" in the pull-down menu, the main controller 41 confirms the language or "None" represented by the image displayed at the touched position, through the touch panel 35, and registers the Downward in association with the confirmed language or with no language, in the language table LDT shown in FIG. 4 (S209).

Further, when the user touches one of the pull-down keys 65D and 65E of the switch box 63D and 63E corresponding to the display fields 62D and 62E, the main controller 41 detects the touch operation performed on that one pull-down key (S203 "Rightward" or "Leftward"), and the display controller 42 displays a pull-up menu 68 on the upper side of the touched key (S210 or S212). Then, when the user touches one of the images representing the language or "None" in the pull-up menu, the main controller 41 confirms, through the touch panel 35, the language or "None" that has been touched, and registers the Rightward or Leftward in association with the confirmed language or with no language, in the language table LDT shown in FIG. 4 (S211 or S213).

Thereafter, upon detecting a touch operation performed on one of the keys 65A to 65E and the OK key 64, through the touch panel 35, the main controller 41 decides whether the touch operation has been performed on the OK key 64 (S215). When the main controller 41 decides that the touch operation has been performed not on the OK key 64, but on one of the keys 65A to 65E (No at S215), the operation returns to S203.

When the main controller 41 decides that the touch operation has been performed on the OK key 64 (Yes at S215), the main controller 41 looks up the language table LDT shown in FIG. 4, to decide whether any of the Default, Upward, Downward, Rightward, and Leftward is registered in association with a plurality of languages in duplication (S216).

Figure 8:
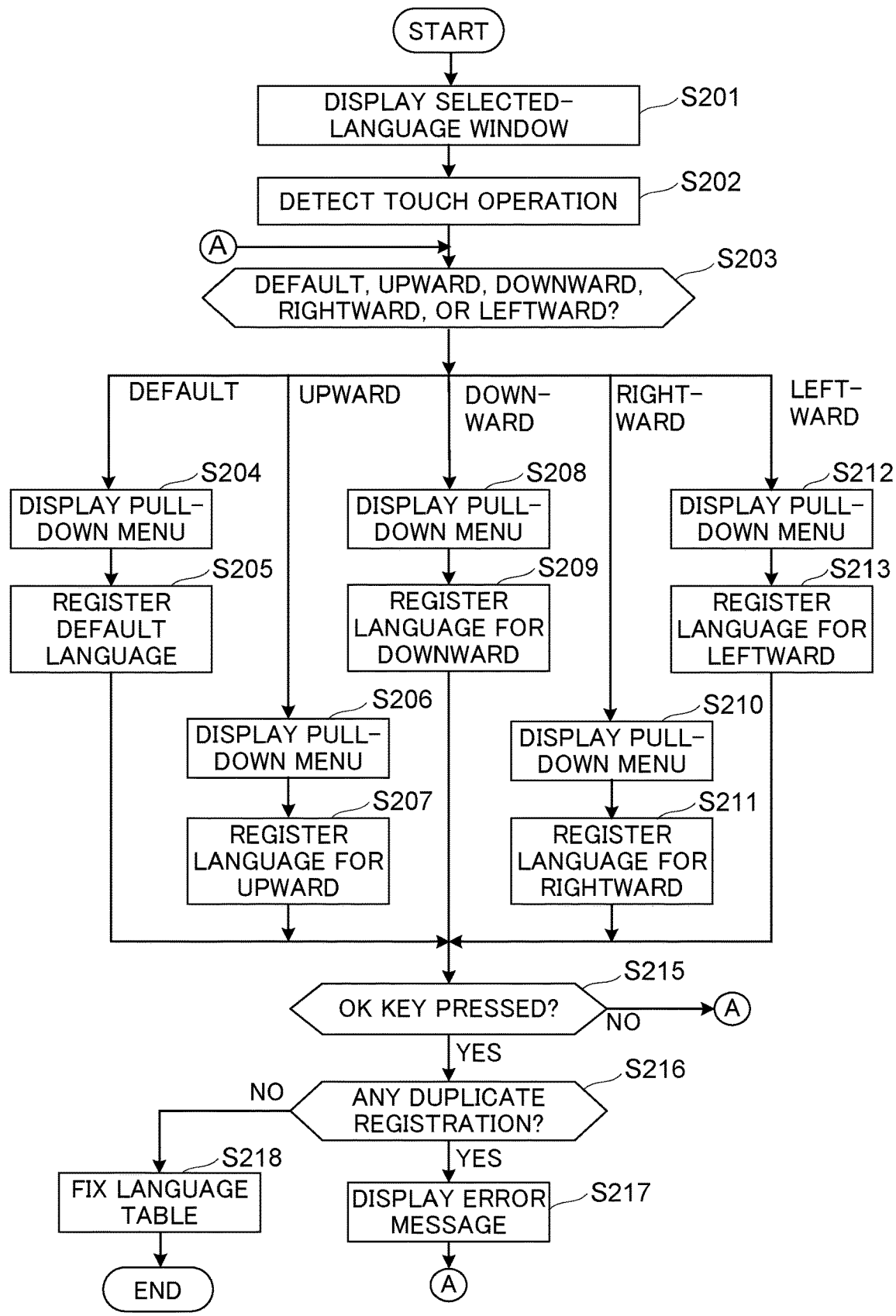
FIG. 8 is a flowchart showing a process for changing a default language, and changing the correspondence between slide operations in upward, downward, rightward, and leftward directions and the respective language.

Upon deciding that none of the Default, Upward, Downward, Rightward, and Leftward is registered in association with a plurality of languages in duplication (No at S216), the main controller 41 fixes the content of the language table LDT shown in FIG. 4 (S218), and finishes the process shown in FIG. 8.

In the case where the main controller 41 decides that one or more of the Default, Upward, Downward, Rightward, and Leftward is registered in association with a plurality of languages in duplication (Yes at S216), the main controller 41 generates an error message indicating the duplicate registration, and causes the display unit 32, through the display controller 42, to display the error message on the screen (S217). Thereafter, the operation returns to S203. In view of the error message, the user can touch one of the keys 65A to 65E and touch one of the images representing the language in the pull-down menu or pull-up menu, to thereby cancel the duplicate registration of the plurality of languages.

As described above, the user can change the default language, or the correspondence between the upward, downward, rightward, and leftward slide directions and the respective languages to be displayed in association.

The present invention is not limited to the foregoing embodiment, but may be modified in various manners. For example, although the upward, downward, rightward, and leftward slide directions are specified in the embodiment, an upper right diagonal, an upper left diagonal, a lower right diagonal, and a lower left diagonal direction may be added to the mentioned directions, thus specifying eight directions, so that eight languages can be registered in association with the respective slide directions. In this case, the main controller 41 detects which of the eight directions the slide operation corresponds to, and the display controller 42 displays the selected-language window TW formed by substituting the character or character string of the default language with the character or character string of the language corresponding to the slide direction detected as above.

Further, still other slide directions may be specified, so that an increased number of languages can be registered in association therewith.

A non-detection region may be provided between two slide directions respectively corresponding to two languages, and the main controller 41 may be exempted from detecting the direction of the slide operation performed in the non-detection region.

In the foregoing embodiment, the main controller 41 detects the direction of the slide operation, when the user touches a desired position on the non-operational region HR for equal to or longer than the predetermined operation time TS, and successively performs a slide operation. Alternatively, the main controller 41 may detect the direction of the slide operation, when the user only performs a slide operation on the non-operational region HR.

Further, although the display controller 42 maintains the selected-language window TW, as long as the user is continuing with the slide operation, or is still touching the end position of the slide operation after stopping the sliding motion, the display controller 42 may display the selected-language window TW, only until a predetermined displaying time elapses after the user has started the slide operation.

Although the image forming apparatus according to the present invention is exemplified by a color multifunction peripheral in the foregoing embodiment, the present invention is broadly applicable to a monochrome multifunction peripheral or other types of electronic apparatus, or other types of image forming apparatus such as a printer, a copier, and a facsimile machine.

The configurations and processings according to the embodiment, described with reference to FIG. 1 to FIG. 11B, are merely exemplary and in no way intended to limit the present invention to those configurations and processings.

The invention claimed is:

1. An image forming apparatus comprising:
a display unit;
a touch panel provided in the display unit;
a storage unit containing, by each of a plurality of languages respectively associated with each direction of slide operations that are performed on the touch panel and are different from each other, a character or character string to be displayed on the display unit; and
a controller configured to:
cause the display unit to display, on a screen, an instruction-receiving image to be touched through the touch panel;
detect, when a slide operation is performed on a non-operational region where the instruction-receiving image is not located, a direction of the slide operation, and retrieve the character or character string of the language associated with the detected direction of the slide operation, from the storage unit; and
cause the display unit to display, for a predetermined period of time, a selected-language window formed by substituting the character or character string displayed on the screen of the display unit, with the character or character string retrieved from the storage unit,
wherein the direction of the slide operation is one of upward, downward, rightward, and leftward directions, and
when a touch operation on the non-operational region is performed for equal to or longer than a predetermined operation time and the slide operation is successively performed from the touched position, the controller detects the direction of the slide operation from one of the upward, downward, rightward, and leftward directions, retrieves the character or character string of the language associated with the detected direction from the storage unit, and applies the retrieved character or character string of the language to the substituting.

2. The image forming apparatus according to claim 1, wherein the controller invalidates the touch operation performed through the touch panel on the instruction-receiving image, when the touch operation on the non-operational region is performed for equal to or longer than the predetermined operation time.

3. The image forming apparatus according to claim 2, wherein the controller validates the touch operation performed through the touch panel on the instruction-receiving image, when the predetermined period has elapsed.

4. The image forming apparatus according to claim 1, wherein the predetermined period includes a period during which the slide operation or an end position of the slide operation is detected through the touch panel.

5. The image forming apparatus according to claim 1, wherein the controller specifies one of the plurality of languages as a default language, and
the controller respectively associates the languages other than the default language with each direction of the slide operations that are performed on the touch panel and are different from each other, and causes the display unit, upon detecting the direction of the slide operation, to display the selected-language window formed by substituting the character or character string of the default language with the character or character string of a language associated with the detected direction of the slide operation.

6. The image forming apparatus according to claim 5, wherein the controller accepts that one of the directions of the slide operations is associated with none of the languages.

7. The image forming apparatus according to claim 1, wherein the controller causes the display unit to display the selected-language window, in a reduced size.

* * * * *